United States Patent [19]

Soma et al.

[11] Patent Number: 5,612,012

[45] Date of Patent: Mar. 18, 1997

[54] METHOD FOR REMOVING CARBON MONOXIDE FROM REFORMED GAS

[75] Inventors: Takao Soma, Aichi-prefecture; Tomonori Takahashi, Chita; Manabu Isomura, Tsushima, all of Japan

[73] Assignee: NGK Insulators, Ltd., Nagoya, Japan

[21] Appl. No.: 451,367

[22] Filed: May 26, 1995

[30] Foreign Application Priority Data

Jun. 8, 1994 [JP] Japan ................................ 6-126338

[51] Int. Cl.⁶ .................................................. C01B 31/18

[52] U.S. Cl. ...................... 423/246; 423/210; 423/230; 423/247; 502/325; 502/333; 502/346; 502/350

[58] Field of Search ...................... 423/210, 230, 423/247, 658.3; 429/13; 123/DIG. 12; 502/325, 333, 346, 350; 48/198.3

[56] References Cited

U.S. PATENT DOCUMENTS

| | | | |
|---|---|---|---|
| 3,615,164 | 10/1971 | Baker et al. | 23/2 |
| 4,522,894 | 6/1985 | Hwang et al. | 429/17 |
| 5,030,440 | 7/1991 | Lynwood et al. | 423/655 |
| 5,225,391 | 7/1993 | Stonehart et al. | 502/324 |

FOREIGN PATENT DOCUMENTS

| | | |
|---|---|---|
| 4-325402A | 11/1992 | Japan. |
| 5-201702A | 8/1993 | Japan. |
| 5-251104A | 9/1993 | Japan. |

*Primary Examiner*—Deborah Jones
*Assistant Examiner*—Amy M. Harding
*Attorney, Agent, or Firm*—Ronald J. Kubovcik, Esq.

[57] ABSTRACT

A method for removing CO from a reformed gas includes the steps of treating the reformed gas by a hydrogen purifier to decrease a ratio of the concentration of components other than hydrogen to the concentration of hydrogen so that the ratio may be lower than in the reformed gas, and then converting CO contained in the gas treated by the hydrogen purifier into a gas other than CO. CO can be removed from the reformed gas, and simultaneously high-purity hydrogen can also be obtained, which leads to the increase of a fuel efficiency and the inhibition effect of performance deterioration.

10 Claims, 1 Drawing Sheet

METHANOL
+ ⇒
WATER

METHANOL
+ ⇒
WATER

METHOD FOR REMOVING CARBON MONOXIDE FROM REFORMED GAS

BACKGROUND OF THE INVENTION (i) Field of the Invention

The present invention relates to a method for removing carbon monoxide (CO) from a reformed gas for the purpose of feeding a gas having a low CO concentration and a high hydrogen concentration to a system in which a gas containing hydrogen as a main component obtained by reforming a hydrocarbon such as methane or propane, or a hydrocarbon having an oxygen atom such as methanol or ethanol is used as a fuel gas for a fuel cell. In particular, the method of the present invention can be suitably applied to a solid polymeric type fuel cell in which the low CO concentration is required.

(ii) Description of the Related Art

In a phosphate type fuel cell or a solid polymeric type fuel cell, a reformed gas containing hydrogen as a main component is obtained on the side of a hydrogen pole by a fuel reformer. As a fuel for the fuel reformer, there can be used a fossil fuel such as methane, propane or naphtha, and such a fuel is reformed with water vapor or the like to obtain a reformed gas, or alternatively methanol or ethanol may be subjected to a water vapor reforming treatment to obtain the reformed gas. However, in the reformed gas, about 1% of CO is contained, and this CO poisons Pt which is used as an electrode catalyst, whereby the performance of the fuel cell deteriorates inconveniently. Particularly in the solid polymeric type fuel cell, its operation temperature is as low as 100° C. or less, so that the influence of the CO poison is serious.

In order to eliminate the influence of the CO poison, it is necessary that the CO concentration should be 10 ppm or less, preferably several ppm or less.

For some means for solving these problems, the following techniques have been heretofore disclosed.

Japanese Patent Application Laid-open No. 201702/1993 discloses a technique that a small amount of air is added to the reformed gas to oxidize CO into $CO_2$.

Furthermore, in Japanese Patent Application Laid-open No. 325402/1992, there has been described a method in which hydrogen alone is allowed to permeate through a hydrogen high-selective film such as a Pd alloy film, whereby the feed of CO to a fuel cell can be inhibited.

In addition, Japanese Patent Application Laid-open No. 251104/1993 discloses a technique that CO is hydrogenated to convert the same into methane.

However, in the technique disclosed in Japanese Patent Application Laid-open No. 201702/1993 in which air is added to selectively oxidize CO, the addition of air lowers the partial pressure of hydrogen to deteriorate the efficiency of the fuel cell. In addition, there are a problem that a pump for feeding air is required and another problem that the danger of explosion is always present.

In the method disclosed in Japanese Patent Application Laid-open No. 325402/1992 in which hydrogen alone is allowed to permeate through a hydrogen high-selective film such as the Pd alloy film, whereby the feed of CO to the fuel cell can be inhibited, a gas having a high hydrogen concentration can be obtained, which indicates that this method is excellent. However, if pinholes having the size of a gaseous molecule level exist in the Pd alloy hydrogen separating film, or if pinholes occur by a certain external load, CO in the reformed gas permeates through the film and reaches the fuel cell inconveniently on occasion.

In the technique in which CO is hydrogenated to convert the same into methane, the reaction of $CO+3H_2 \rightarrow CH_4+H_2O$ is carried out to form methane, but CO still remains in an amount of several ppm. Thus, it is difficult to decrease the CO concentration to several ppm or less only by the catalytic reaction. It has been disclosed in Japanese Patent Application Laid-open No. 251104/1993 that after CO is oxidized to lower the CO concentration to some extent, the conversion of CO into methane can be done to decrease the CO concentration to 0 ppm. However, the disclosed process is complex and a large apparatus is required inconveniently. According to the process which has been disclosed herein, about 20% of $CO_2$ contained in the reformed gas is also fed to the fuel cell, so that the partial pressure of hydrogen is low, with the result that a power generation efficiency is low.

SUMMARY OF THE INVENTION

Objects of the present invention are to provide a method for removing CO from a reformed gas, capable of solving the above-mentioned problems. According to the present invention there is provided a method for removing CO from a reformed gas which comprises the steps of treating the reformed gas by a hydrogen purifier to decrease a ratio of the concentration of components other than hydrogen to the concentration of hydrogen so that the ratio may be lower than in the reformed gas, and then converting CO contained in the gas treated by the hydrogen purifier into a gas other than CO by reaction.

In a fuel cell, the lower a CO concentration is, the lower the poisonous properties of CO to electrodes is, and the higher the concentration of fuel hydrogen to be fed is, the higher a power generation efficiency is. The present invention is an epoch-making invention which can meet both of these requirements simultaneously.

DETAILED DESCRIPTION OF THE INVENTION

Figure 1:
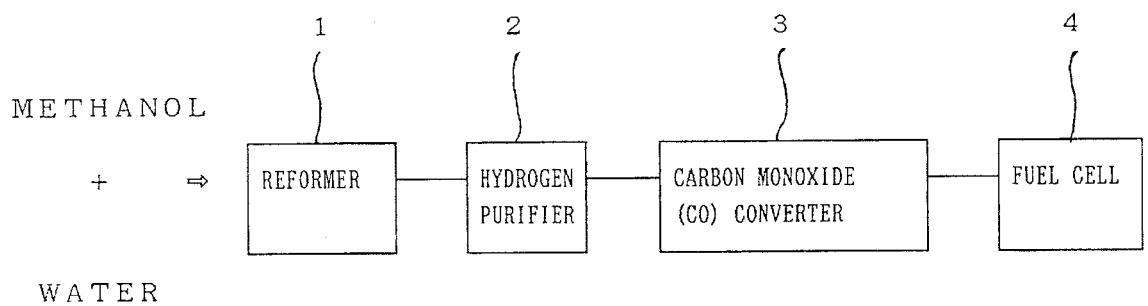
FIG. 1 is a flow chart of a method for removing CO according to the present invention.

According to the present invention, in order to heighten the concentration of hydrogen, a reformed gas is treated by a hydrogen purifier to decrease a ratio of the concentration of components other than hydrogen to the concentration of hydrogen so that the ratio may be lower than in the reformed gas, and CO contained in the gas treated by the hydrogen purifier is converted into a gas other than CO by reaction and then removed.

The reason why the treatment is carried out by the hydrogen purifier is as follows; In the case that CO is converted into methane by hydrogenation, methane can be produced in accordance with-the reaction formula of $CO+3H_2 \rightarrow CH_4+H_2O$. If a hydrogen concentration is set so as to be much higher than a CO concentration in this reaction, the equilibrium of the reaction largely shifts to the right side of the reaction formula, whereby CO can be completely converted by the reaction. In the present invention, the treatment can be carried out by the use of the hydrogen purifier to heighten the hydrogen concentration.

Furthermore, this increase of the hydrogen concentration leads to the improvement of the power generation efficiency of the fuel cell.

As the hydrogen purifier, a hydrogen separating apparatus in which an alloy containing Pd is used is preferable. The hydrogen separating apparatus, for example, comprises a porous substrate and a Pd alloy film formed on the porous substrate. Preferable examples of the porous substrate include alumina, silica, silica-alumina, mullite, cordierite, zirconia, carbon, porous glass, and a metal such as a stainless filter subjected to a surface treatment.

It is preferable that the volume ratio of hydrogen to CO is regulated to 200 or more by the use of the hydrogen purifier. If the volume ratio is more than this level, the CO concentration can be lowered to 1 ppm or less in a next CO conversion step.

In order to convert CO into the gas other than CO, a hydrogenating reaction of CO is used. There is preferably used a method in which a hydrocarbon such as methane, ethane, methanol or ethanol can be produced by the CO hydrogenation. In the case that methane is produced by the CO hydrogenation, catalysts such as Ru, Rh, Pd, Ir, Pt, Ni and Re can be used, and in the case that methanol is produced, catalysts including as Cu and Fe can be used.

For the miniaturization of the system, the CO converting catalyst may be arranged in the hydrogen purifier so as to simultaneously accomplish the hydrogen purification and the CO conversion. Specifically, the CO converting catalyst may be arranged in the porous portion of a porous substrate tube for supporting the hydrogen separating film, between the hydrogen separating film and the substrate tube, or in the pinholes present in the hydrogen separating film so as to close these pinholes. In addition, if a catalyst for a reformer is also simultaneously arranged together with the CO converting catalyst, the sufficient miniaturization of the system can be effectively achieved.

The operation temperature of the hydrogen purifier is preferably raised in order to increase the hydrogen concentration, and the preferable operation temperature is 200° C. or more. Furthermore, the operation temperature of a CO converter is preferably in the range of 100° to 500° C.

The method for removing CO from the reformed gas of the present invention is preferably used in combination with a fuel cell. In particular, the method of the present invention can be preferably applied to a phosphate type fuel cell or a solid polymeric type fuel cell (PEFC) in which the low CO concentration in a fuel gas is required. Above all, it is effective to apply the method of the present invention to the solid polymeric type fuel cell in which the CO concentration is required to be several ppm or less.

The PEFC is smaller and lighter as compared with other cells, and it is characterized by being operable at a temperature of 100° C. or less. Therefore, the PEFC can be mounted on a car as a portable power source or a power source for an electromobile. When mounted on the car, the PEFC is required to be not only small and light but also resistant to impact such as vibration. In this case, it is preferable that the hydrogen purifier is integrally combined with the CO converter.

Next, the present invention will be described in detail with reference to examples, but the scope of the present invention should not be limited to these examples.

EXAMPLE 1

FIG. 1 shows a flow chart of a fuel cell system in which the present invention is used. A material which was a solution obtained by mixing methanol and water at a molar ratio of 1:1 was reformed in a reformer 1, and the reformed material was then treated in a hydrogen purifier 2 comprising a porous alumina substrate tube and a hydrogen separator obtained by forming a hydrogen separating film of a Pd-Ag alloy on the surface of the substrate tube, thereby heightening the concentration of hydrogen. Next, CO contained in the reformed gas was hydrogenated by a CO converter 3 in which an Ni-supporting alumina was used as a catalyst for hydrogenating CO to form methane, and the thus hydrogenated gas was then fed to a hydrogen pole of a fuel cell 4. A gas composition changed in the respective steps as shown in Table 1. According to the results, a CO concentration in the gas coming from the CO converter 3 was as low as 0.1 ppm or less. The voltage-current properties of the fuel cell were measured, and as a result, it was confirmed that the measured properties were not different at all from a case where pure hydrogen containing no CO was fed.

In this connection, the temperatures of the reformer, the hydrogen purifier and the CO converter were set to 300° C., 280° C. and 260° C., respectively.

TABLE 1

| | Components of Gas | | | | |
|---|---|---|---|---|---|
| | $H_2$ | $CO_2$ | $H_2O$ | CO | $CH_4$ |
| at Outlet of Reformer | 73.5% | 23.5% | 2.3% | 0.7% | 0% |
| at Outlet of Hydrogen Purifier | 99.99% | 200 ppm | 100 ppm | 70 ppm | 0% |
| at Outlet of CO Converter | 99.99% | 200 ppm | 170 ppm | 0.1 ppm or less | 70 ppm |

EXAMPLE 2

Figure 2:
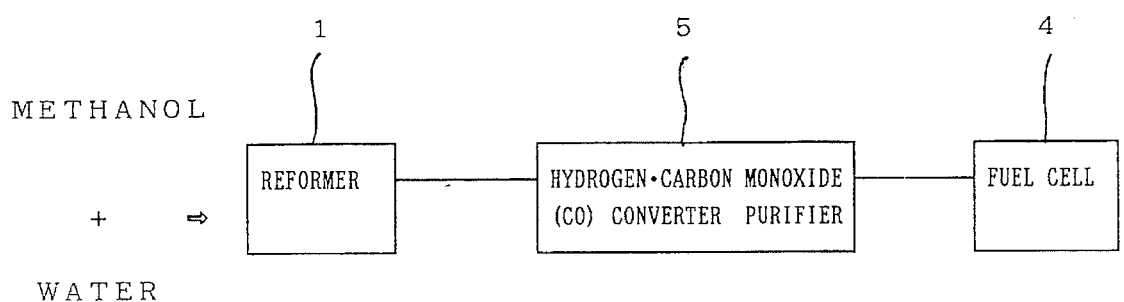
FIG. 2 is a flow chart of a case where a hydrogen purifier and a CO converter are integrally combined.

A hydrogen purifier•CO converter 5 was prepared by supporting Ni-alumina as a CO hydrogenating catalyst on the porous portion of a porous alumina substrate tube supporting a hydrogen separating film and constituting a hydrogen purifier used in Example 1. Next, a material gas was treated under the same conditions as in Example 1 by the use of the hydrogen purifier•CO converter 5, and a gas composition was measured. At the outlet of the hydrogen purifier•CO converter 5, a CO concentration was 0.1 ppm or less, and it was confirmed that the voltage-current properties of a fuel cell were not different at all from a case where pure hydrogen containing no CO was fed. FIG. 2 shows its flow chart. In this connection, the temperatures of a reformer and the hydrogen purifier•CO converter were set to 300° C. and 280° C., respectively.

As described above, according to the present invention, CO can be removed from a reformed gas, and simultaneously high-purity hydrogen can also be obtained, which leads to the increase of a fuel efficiency and the inhibition effect of performance deterioration.

What is claimed is:

1. A method for removing carbon monoxide from a reformed gas said method comprising the steps of providing a reformed gas containing hydrogen, carbon dioxide, carbon monoxide and water, treating the reformed gas by subjecting said gas to a hydrogen purifier to reduce the concentration of carbon dioxide, carbon monoxide and water thereby decreasing the ratio of the concentration of components other than hydrogen to the concentration of hydrogen and then converting the carbon monoxide contained in the treated gas into a gas other than carbon monoxide.

2. A method for removing carbon monoxide from a reformed gas according to claim 1, wherein the hydrogen purifier is a hydrogen separating apparatus comprising an alloy containing Pd.

3. A method for removing carbon monoxide from a reformed gas according to claim 2, wherein the hydrogen separating apparatus comprises a porous substrate and a Pd alloy film formed on the porous substrate.

4. A method for removing carbon monoxide from a reformed gas according to claim 2, wherein the hydrogen separating apparatus further comprises a carbon monoxide converting catalyst.

5. A method for removing carbon monoxide from a reformed gas according to claim 2, wherein the hydrogen separating apparatus has an operation temperature of 200° C. or more.

6. A method for removing carbon monoxide from a reformed gas according to claim 2, wherein the carbon monoxide is converted into a gas other than carbon monoxide using a catalyst.

7. A method for removing carbon monoxide from a reformed gas according to claim 6, wherein the catalyst is integrally combined with the hydrogen separating apparatus.

8. A method for removing carbon monoxide from a reformed gas according to claim 1, wherein the hydrogen purifier regulates the volume ratio of hydrogen to carbon monoxide to 200 or more.

9. A method for removing carbon monoxide from a reformed gas according to claim 1, wherein a carbon monoxide converter is used to convert carbon monoxide into a gas other than carbon monoxide.

10. A method for removing carbon monoxide from a reformed gas according to claim 9, wherein an operation temperature of the carbon monoxide converter is in the range of 100° to 500° C.

* * * * *